United States Patent [19]
Neuerburg et al.

[11] Patent Number: 5,934,050
[45] Date of Patent: Aug. 10, 1999

[54] CUTTING MACHINE FITTED WITH AN AUTOMATIC RETRACTABLE STOP

[75] Inventors: Horst Neuerburg, Saverne; Jean-Paul Lacroix, Mommenheim, both of France

[73] Assignee: Kuhn S.A., Saverne Cedex, France

[21] Appl. No.: 08/954,061

[22] Filed: Oct. 20, 1997

[30]     Foreign Application Priority Data

Oct. 31, 1996   [FR]   France ................................. 96 13489

[51] Int. Cl.⁶ .................................................. A01D 34/66
[52] U.S. Cl. .................................. 56/6; 56/15.2; 56/15.9; 56/16.3; 56/DIG. 14
[58] Field of Search ........................... 56/6, 7, 15.8, 15.9, 56/13.6, 15.1, 15.2, 16.3, DIG. 14

[56]               References Cited

U.S. PATENT DOCUMENTS

| 5,241,809 | 9/1993 | Wolff et al. . |
| 5,566,537 | 10/1996 | Kieffer et al. ............................ 56/6 X |
| 5,724,794 | 3/1998 | Wolff ............................................ 56/6 |

FOREIGN PATENT DOCUMENTS

| 0 556 143 A1 | 8/1993 | European Pat. Off. . |
| 0 734 645 A2 | 10/1996 | European Pat. Off. . |
| 2 675 980 | 11/1992 | France . |
| 1 757 434 | 4/1971 | Germany . |
| 91 12 331 | 1/1992 | Germany . |
| 41 10 430 A1 | 10/1992 | Germany . |
| 6 918 351 | 6/1971 | Netherlands . |
| 9202216 | 7/1994 | Netherlands . |
| 1119644 | 7/1968 | United Kingdom . |
| 2 157 936 | 11/1985 | United Kingdom . |

*Primary Examiner*—Heather Shackelford
*Attorney, Agent, or Firm*—Oblon, Spivak, McClelland, Maier & Neustadt, P.C.

[57]               ABSTRACT

A cutting machine includes a cutting mechanism, an operating device and a carrying beam connected to the cutting mechanism by an articulation. The operating device includes a retractable stop which limits the upwards pivoting of the carrying beam about a longitudinal axis of the articulation when the cutting mechanism is extending in a windrowing position and which is retracted to allow the cutting mechanism to be placed in a transport position. The retractable stop is set in place and retracted automatically by a control mechanism when the cutting mechanism is brought from a work position or from the windrowing position into the transport position.

14 Claims, 6 Drawing Sheets

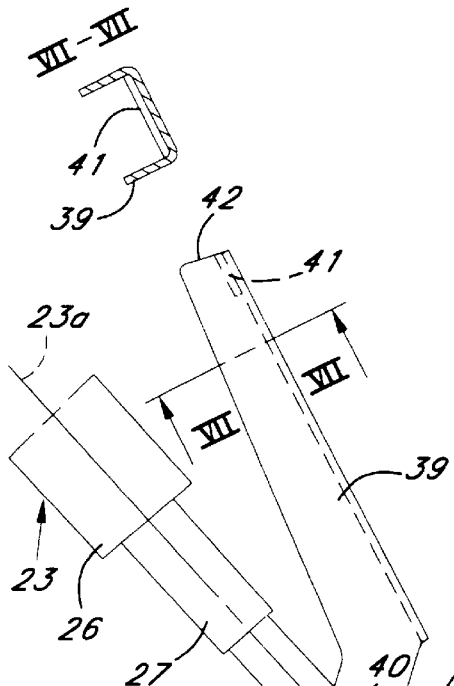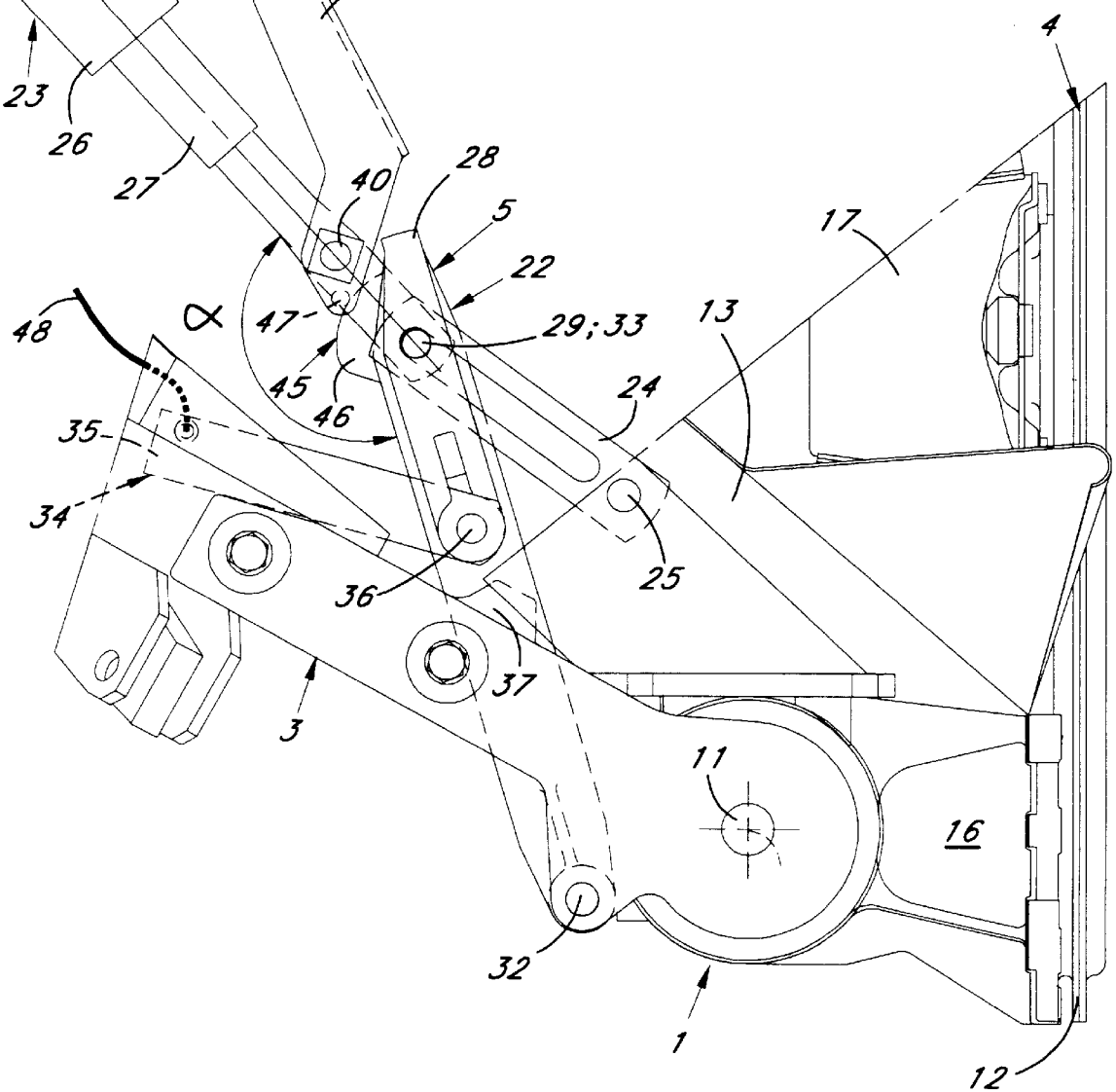

CUTTING MACHINE FITTED WITH AN AUTOMATIC RETRACTABLE STOP

BACKGROUND OF THE INVENTION

1. Field of the Invention

The present invention relates to a cutting machine comprising:

a cutting mechanism extending:
in the work position, transversely to the direction of travel and level with the ground;
in the windrowing position, transversely to the direction of travel and at a certain distance above the ground; and
in the transport position, substantially vertically upwardly oriented;
a hitching structure intended to be connected to the hitching device of a motor vehicle;
a carrying beam connected on the one hand to the hitching structure by means of a first articulation and on the other hand to the cutting mechanism by means of a second articulation;
an operating device allowing the cutting mechanism to be brought into the various positions and comprising:
an operating member comprising a latch intended to stop the upwards pivoting of the cutting mechanism about the longitudinal axis of the second articulation during movement into the windrowing position; and
an operating ram connected at one of its ends to the operating member and at the other of its ends to the hitching structure by means of two corresponding articulations.

2. Discussion of the Background

A cutting machine of this kind is known from document FR 96 05051.

This cutting machine broadly speaking comprises a cutting mechanism, a hitching structure, a carrying beam and an operating device.

The carrying beam is connected on the one hand to the hitching structure by means of a first articulation and on the other hand to the cutting mechanism by means of a second articulation.

The operating device comprises an operating member comprising a first lever connected to the cutting mechanism, a second lever connected to the carrying beam and to the first lever, and a latch intended to stop the upwards pivoting of the cutting mechanism during movement into the windrowing position.

The latch is composed of a third lever connected on the one hand to the second lever and on the other hand coming to rest against the carrying beam while the cutting mechanism is being placed in the windrowing position.

The operating device additionally comprises an operating ram which in particular allows the cutting mechanism to be brought into the windrowing position. This operating ram is connected to the hitching structure and to the second lever.

The assembly composed of the operating ram, the hitching structure, the carrying beam and the second lever forms a deformable quadrilateral.

When the operator wishes to move the mower from the work position to the windrowing position, he actuates the operating ram, from the motor vehicle, and this ram shortens causing the cutting mechanism to pivot upwards about the second articulation until the latch comes to rest on a stop provided on the carrying beam. From that moment on, the cutting mechanism and the carrying beam pivot about the first articulation that connects the carrying beam to the hitching structure until a limiting device fitted between the hitching structure and the carrying beam limits this second pivoting.

The energy developed by the operating ram depends on the power of the motor vehicle by means of which it is operated. In the windrowing position, all of the energy developed by the operating ram is transferred to the hitching structure, the operating member and the carrying beam, and this means a hitching structure, an operating member and a carrying beam, together with the various articulations concerned, which are particularly highly stressed.

SUMMARY OF THE INVENTION

The object of the present invention is to improve the cutting machine of the prior art, while at the same time seeking to obtain a cutting machine that is simple and easy to use.

For this, the cutting machine according to the invention is characterized in that the operating device additionally comprises a retractable stop which limits the pivoting of the carrying beam about the longitudinal axis of the first articulation when the cutting mechanism is extending in the windrowing position and which is retracted to allow the cutting mechanism to be placed in the transport position, the retractable stop being set in place and retracted automatically by means of a control mechanism when the cutting mechanism is brought from the work position or from the windrowing position into the transport position.

A cutting machine of this kind in particular allows the cutting mechanism to be placed in the windrowing position without the hitching structure, the operating member, the carrying beam and the various articulations concerned, being subjected to stresses that are higher than those needed to keep the cutting mechanism in the windrowing position. Furthermore, the movement into the windrowing position, or the movement into the transport or work position does not require any additional operations on the part of the operator because the retractable stop retracts and comes into position automatically when the cutting mechanism is manoeuvred.

The invention also relates to the following features taken in isolation or in any technically possible combination:

the retractable stop limits the travel of the operating ram when the cutting mechanism is extending in the windrowing position, which advantageously allows the surplus energy developed by the operating ram compared with the energy needed to keep the cutting mechanism in the windrowing position to be transferred to the retractable stop;

the retractable stop is connected to the operating ram by means of an articulation that is at least substantially parallel to the articulations that connect the operating ram to the operating member and to the hitching structure, which allows the retractable stop to be pivoted into an inactive position;

the retractable stop is connected to the rod of the operating ram by means of the articulation at least substantially parallel to the articulations that connect the operating ram to the operating member and to the hitching structure;

the retractable stop is intended to rest against the body of the operating ram in the windrowing position;

in the windrowing position, when the retractable stop is resting against the body of the operating ram, the line of action of the retractable stop is at least substantially coincident with the longitudinal axis of the operating ram, which allows the operating ram to work in good conditions without it being subjected to high bending stresses;

in the work position and in the windrowing position, the retractable stop rests on the rod of the operating ram via a protective member intended to protect the rod;

the protective member is made of flexible plastic and is fixed to the retractable stop;

the control mechanism that allows the retractable stop to be set in place and to be retracted comprises a cam which acts on the retractable stop when the cutting mechanism is brought from the work position or from the windrowing position into the transport position;

the cam acts on the retractable stop so as to make it pivot about the articulation that connects the retractable stop to the operating ram;

the cam forms part of a lever belonging to the operating member, the lever being articulated at one of its ends to the end of the operating ram and at the other end to the carrying beam or to the cutting mechanism;

the cam is fitted to the lever belonging to the operating member in such a way that a certain angular variation between the said lever and the operating ram as the cutting mechanism is being placed in the transport position, makes the cam act on the retractable latch in such a way as to make it pivot about the articulation that connects the retractable stop to the operating ram;

the cam acts on the retractable latch when the value of the angle between the lever and the operating ram increases;

the latch of the operating member can be retracted to allow the cutting mechanism to pivot upwards about the longitudinal axis of the second articulation with a view to placing it in the transport position, thus making it possible to increase the value of the angle between the lever and the operating ram, this having the effect of retracting the retractable latch to bring to an end the phase of placing the cutting mechanism in the transport position.

BRIEF DESCRIPTION OF THE DRAWINGS

Other objects and features will emerge from the description hereafter with reference to the appended drawings which represent, by way of non-limiting examples, one embodiment of the cutting machine according to the invention.

In these drawings:

FIG. 6 depicts a partial enlargement of the cutting machine of FIG. 4;

FIG. 7 depicts a section on plane VII—VII defined in FIG. 6.

DESCRIPTION OF THE PREFERRED EMBODIMENTS

Figure 1:
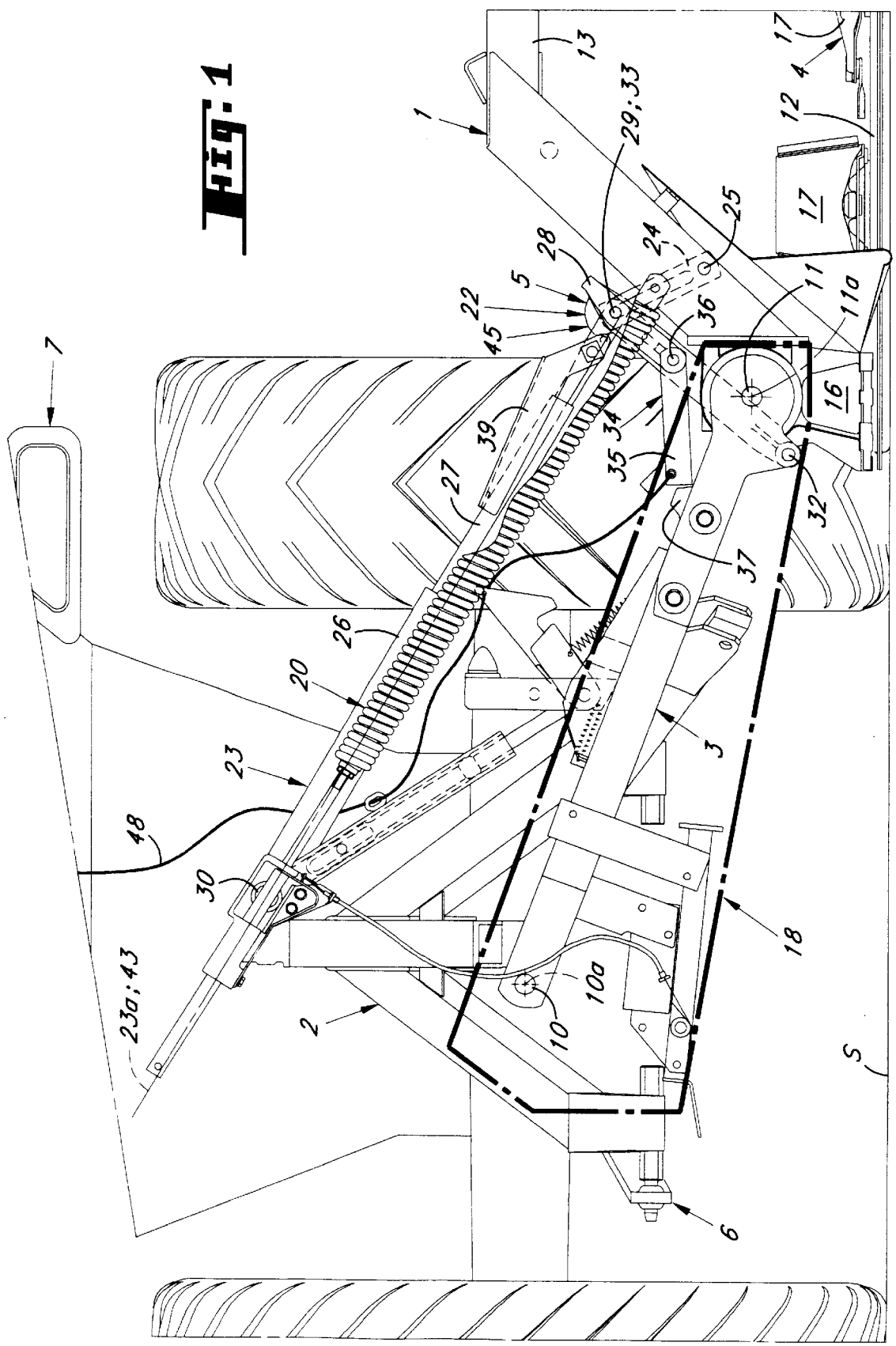
FIG. 1 depicts, in the work position, a cutting machine according to the invention viewed from behind and connected to a motor vehicle.

The cutting machine 1 depicted in FIGS. 1 to 6 comprises a certain number of elements which are similar to those described in document FR 96 05051. For fuller details, reference can, if necessary, be made to the text of the document.

The cutting machine 1 is composed, broadly speaking, of a hitching structure 2, a carrying beam 3, a cutting mechanism 4 and an operating device 5.

The hitching structure 2 is connected to a hitching device 6 of a motor vehicle 7. The carrying beam 3 for its part, during work, extends transversely to the direction of travel 9 and downwards towards the cutting mechanism 4.

At one of its longitudinal ends, the carrying beam 3 is connected to the hitching structure 2 by means of a first articulation 10 with a longitudinal axis 10a that is at least substantially horizontal and points in the direction of travel 9. At the other longitudinal end, the carrying beam 3 is connected to the cutting mechanism 4 by means of a second articulation 11 with a longitudinal axis 11a which is at least substantially parallel to the longitudinal axis 10a of the first articulation 10.

Figure 2:
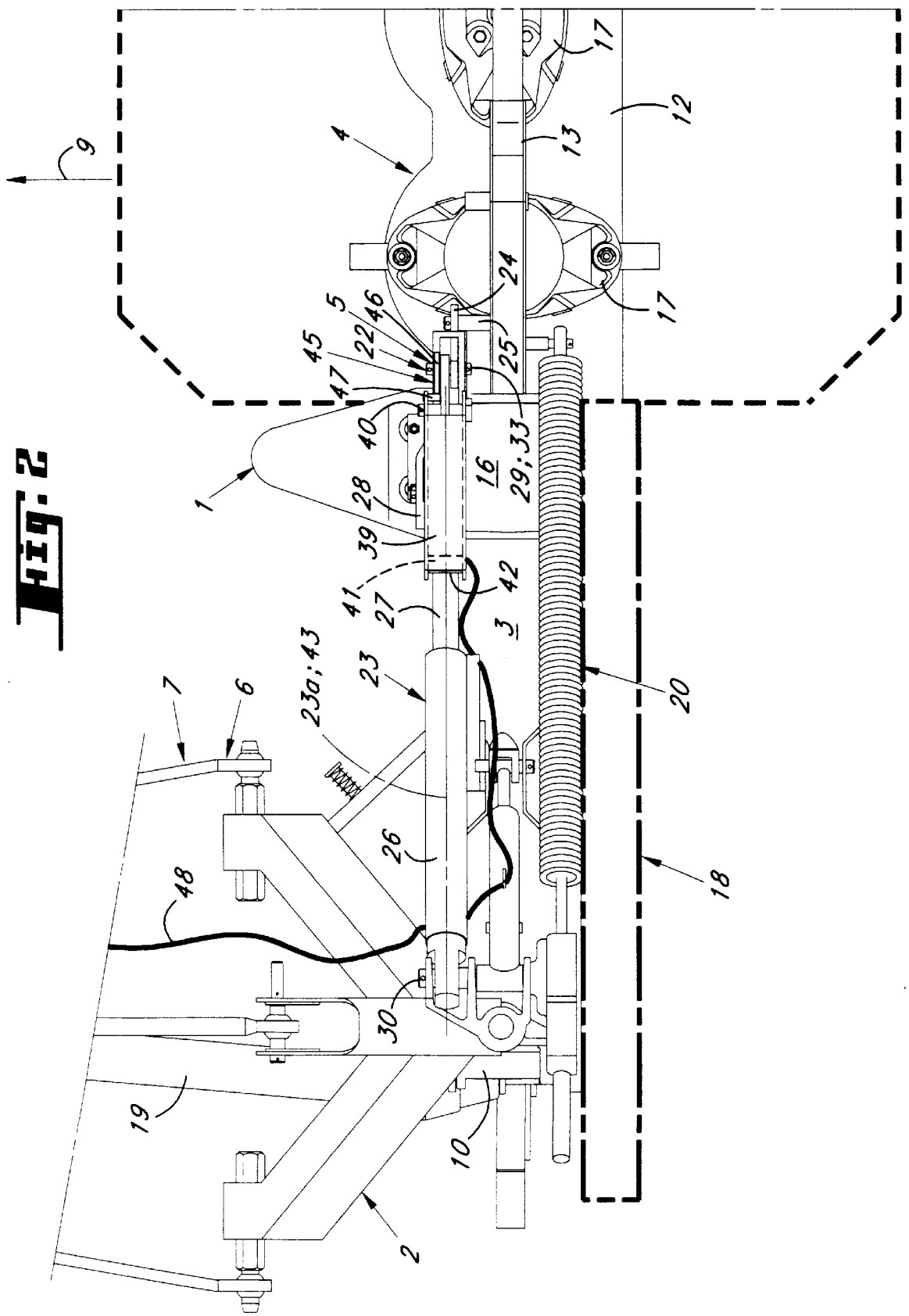
FIG. 2 depicts the cutting machine of FIG. 1, viewed from above.

In the example depicted, the cutting mechanism 4 broadly speaking comprises a cutter bar 12 surmounted by a carrying structure 13 intended, in particular, to support protective members (depicted in broken line in FIG. 2). This carrying structure 13 is fixed to the cutter bar 12 by means of a transmission casing 16. This transmission casing 16 on the one hand connects the cutting mechanism 4 to the carrying structure 3 and on the other hand contains some of the drive members intended to drive the cutting elements 17 of the cutter bar 12.

Extending behind the carrying beam 3 is a transmission device 18 (represented schematically in chain line) which is intended to be driven by means of a transmission shaft 19 with universal joints which is connected to the power take-off (not depicted) of the motor vehicle 7. This transmission device 18 is intended to drive the drive members of the transmission casing 16.

Also provided is a lightening device 20 known to those skilled in the art and intended to lighten the cutting mechanism 4 during work.

Figure 3:
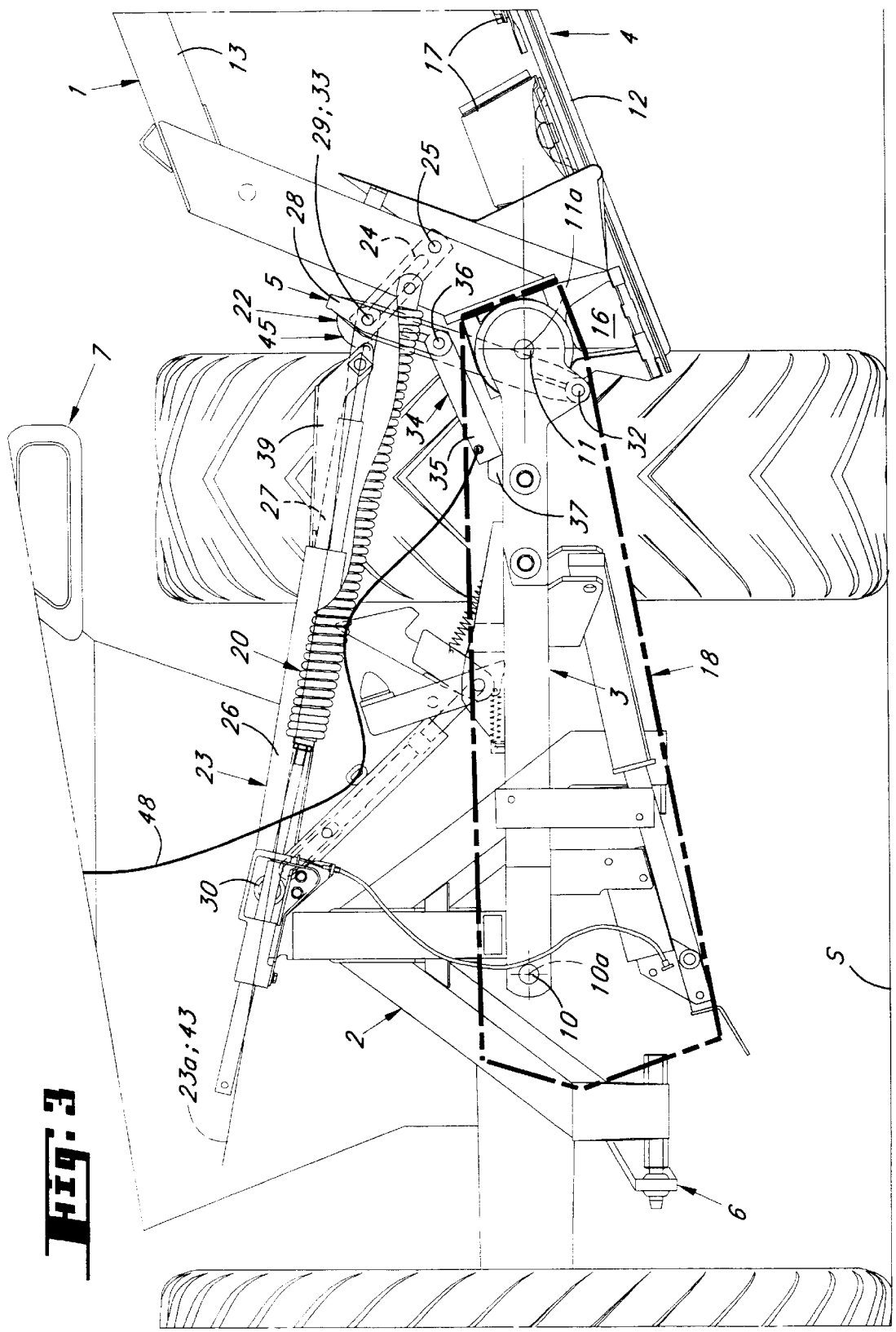
FIG. 3 depicts, in the windrowing position, the cutting machine of FIG. 1 viewed from behind.
Figure 4:
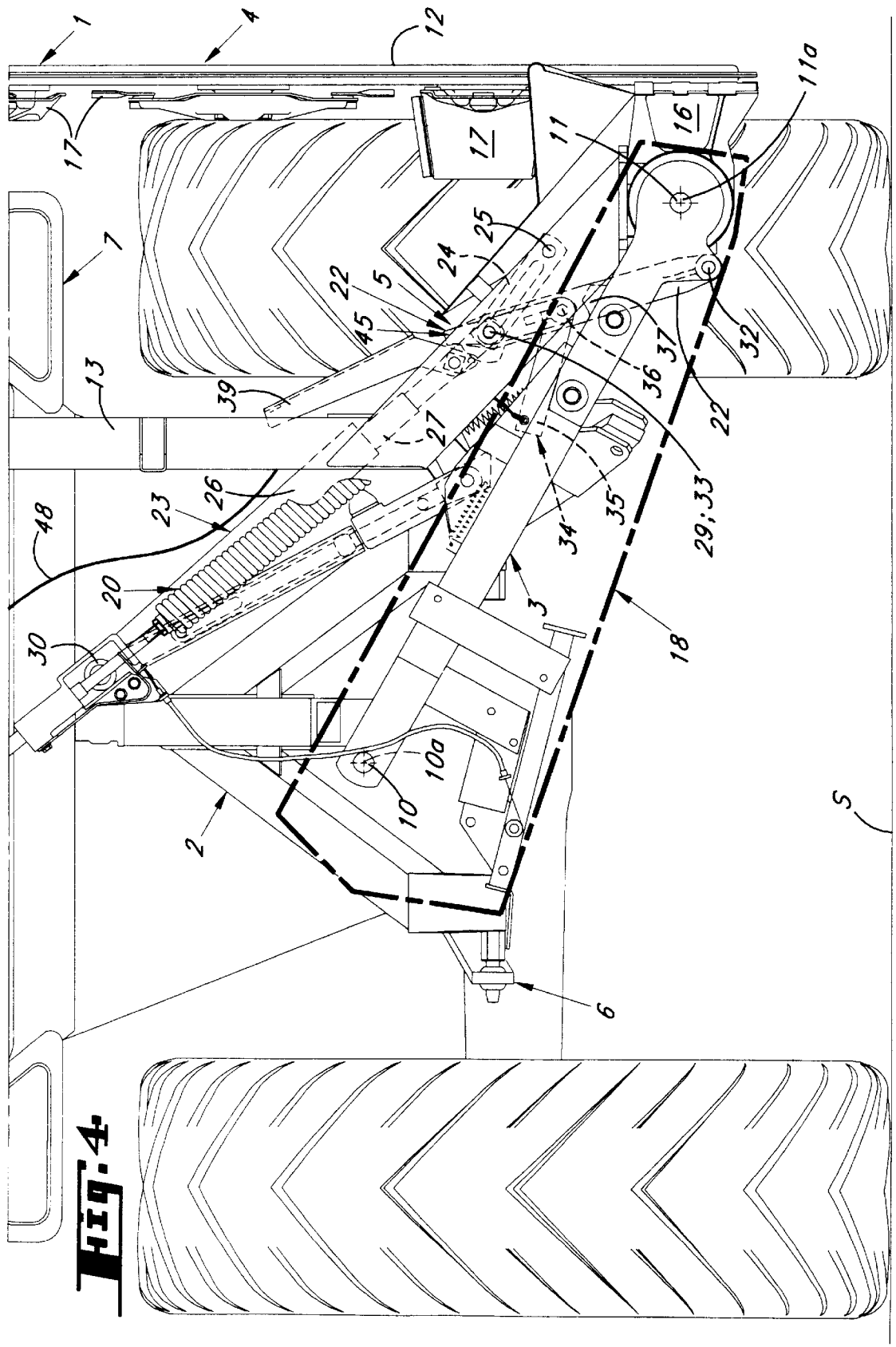
FIG. 4 depicts, in the transport position, the cutting machine of FIG. 1, viewed from behind.
Figure 5:
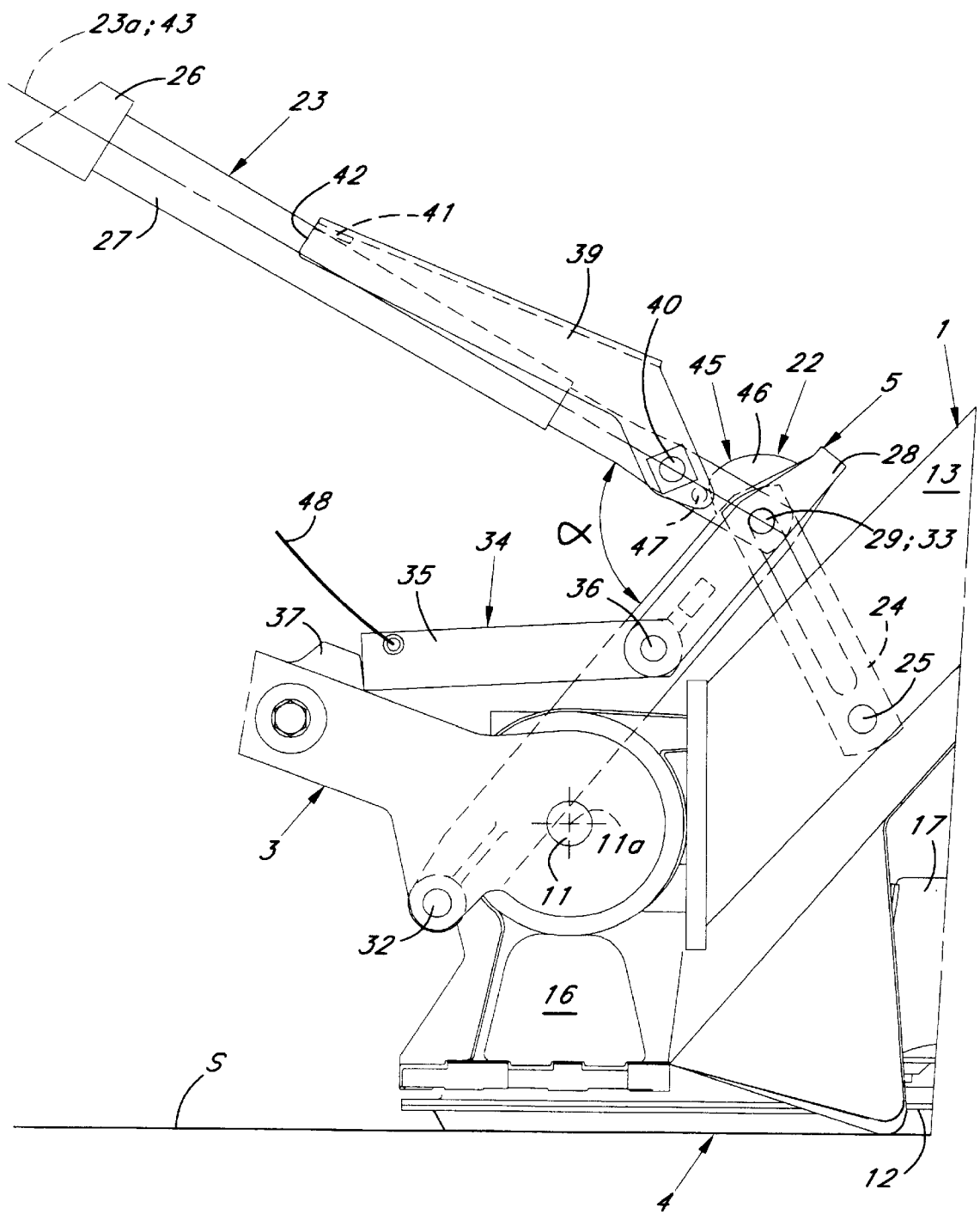
FIG. 5 depicts a partial enlargement of the cutting machine of FIG. 1.

The operating device 5 allows the cutting mechanism 4 to be brought into the transport position (FIGS. 4 and 6), into the work position (FIGS. 1, 2 and 5) and into the windrowing position (FIG. 3).

For this, the operating device 5 comprises an operating member 22 and an operating ram 23. The operating member 22 comprises a first lever 24 connected on the one hand to the carrying structure 13 of the cutting mechanism 4 by means of a third articulation 25. The operating ram 23 comprises a body 26 and a rod 27. The rod 27 of the operating ram 23 is connected to one of the ends of a second lever 28 belonging to the operating member 22 by means of a fourth articulation 29, while the body 26 of the operating ram 23 is connected to the hitching structure 2 by means of a fifth articulation 30.

It will be noted in addition that the second lever 28 is connected at the other of its ends to the carrying beam 3 by means of a sixth articulation 32 and the first lever 24 is connected to the second lever 28 by means of a seventh articulation 33 with a longitudinal axis which is at least substantially coincident with the longitudinal axis of the fourth articulation 29.

The operating member 22 also comprises a latch 34 which in the example depicted consists of a third lever 35 connected to the second lever 28 by means of an eighth articulation 36. The third lever 35 is intended to rest on a stop 37 provided on the carrying beam 3 so as to stop the upward pivoting of the cutting mechanism 4 about the longitudinal axis 11a of the second articulation 11 in a certain position during movement into the windrowing position.

In the light of the various figures, it can further be seen that the operating device 5 comprises a retractable stop 39 which is intended to limit the pivoting of the carrying beam 3 about the longitudinal axis 10a of the first articulation 10 when the cutting mechanism 4 is extending in the windrowing position.

For this purpose, the retractable stop 39 is connected to the rod 27 of the operating ram 23 by means of a ninth articulation 40 which on the one hand is at least substantially parallel to the fourth and to the fifth articulations 29, 30 that respectively connect the rod 27 to the operating member 22 and the body 26 of the operating ram 23 to the hitching structure 2 and on the other hand is situated in close proximity to the fourth articulation 29. In the work position, the retractable stop 39 rests on the rod 27 of the operating ram 23 via a protective member 41 made of flexible plastic and fixed to the retractable stop 39 so as to protect the rod 27. In the work position, just as in the windrowing position, the retractable stop 39 extends in the direction of the body 26 of the operating ram 23 and matches substantially the upper half of the rod 27. In the windrowing position, the retractable stop 39 additionally rests via its front part 42 which is at the opposite end from the ninth articulation 40, against the body 26 of the operating ram 23 so as to limit the stroke thereof, that is to say limit the extent to which the rod 27 can be retracted back into the body 26.

In the example depicted, the retractable stop 39 has a U-shaped cross-section as depicted in FIG. 7, so that in the windrowing position, the line of action 43 of the retractable stop 39 is at least substantially coincident with the longitudinal axis 23a of the operating ram 23 so as to allow the operating ram 23 to work in good conditions without it being subjected to high bending stresses.

It will also be observed that the retractable stop 39 is retracted automatically during movement into the transport position, so as to allow the rod 27 to retract still further into the body 26 in order for the cutting mechanism 4 to be moved into the transport position.

For this, a control mechanism 45 is provided and this acts automatically on the retractable stop 39 so as to bring the retractable stop 39 into position during movement into the work position and to retract this stop during movement into the transport position.

For this purpose, the control mechanism 45 comprises a cam 46 fitted on the second lever 28 of the operating member 22 in the vicinity of the fourth and ninth articulations 29, 40. This cam 46 acts on the retractable stop 39 via a bearing element 47 belonging to the retractable stop 39 when the cutting mechanism 4 is brought from the work position or from the windrowing position into the transport position.

It will be observed that the cam 46 acts on the bearing element 47 of the retractable stop 39 in such a way as to make the latter pivot upwards into the retracted position about the ninth articulation 40 that connects the retractable stop 39 to the rod 27 of the operating ram 23. For this purpose, the bearing element 47 is situated between the ninth articulation 40 and the cam 46, and in the windrowing position and work position, in close proximity to the cam 46.

The operating device 5 of the cutting machine 1 according to the invention, works as follows.

When the cutting mechanism 4 is in the work position, it extends transversely to the direction of travel 9 and level with the ground S. The retractable stop 39 rests on the rod 27 of the operating ram 23 via the protective member 41 and the cam 46 of the control mechanism 45 extends in close proximity to the bearing element 47 of the retractable stop 39. The third lever 35 for its part extends in close proximity to the stop 37.

The operating member 22 of the operating device 5 works in a similar way to the one described in document FR 96 05051. For fuller details, reference can, if necessary, be made to the text of the document.

When the operator wishes to move the cutting machine 1 from the work position into the windrowing position he operates the operating ram 23 from the motor vehicle 7 so as to make the rod 27 retract into the body 26. For this to happen, the second lever 28 of the operating member 22 pivots about the sixth articulation 32 and this has the effect of making the cutting mechanism 4 pivot, at a given moment, slightly upwards about the second articulation 11 until the instant when the latch 34 comes to rest against the stop 37. From this moment on, the cutting mechanism 4 and the carrying beam 3 pivot about the first articulation 10 until the front part 42 of the retractable stop 39 comes to rest against the body 26 of the operating ram 23, which has the effect of stopping the retraction of the rod 27 into the body 26 and of determining the windrowing position of the cutting machine 1.

It will be noted that during this movement into the windrowing position, the value of the angle α between the second lever 28 and the rod 27 of the operating ram 23 increases a little, and this has the effect of moving the cam 46 into close proximity to the bearing element 47.

In this windrowing position (FIG. 3), the carrying beam 3 extends substantially horizontally and the cutting mechanism 4 extends upwards a certain distance above the ground S.

To return the cutting machine 1 to the work position, all the operator needs to do is operate the operating ram 23 in such a way that it can extend, and this allows the carrying beam 3 and the cutting mechanism 4 to return to their work position under the effect of their own weight.

When the operator wishes to move the cutting machine 1 from the work position into the transport position he first of all lifts the hitching structure 2 using the hitching device 6 of the motor vehicle 7, and this has the effect of raising that part of the cutting mechanism 4 which is closest to the hitching structure 2. Next, the operator pivots the latch 34 upwards about the eighth articulation 36 using a cord 48 so that the latch 34 comes free of the stop 37 and is neutralized. Sustaining his action on the cord 48 the operator then also operates the operating ram 23 which shortens and makes the cutting mechanism 4 pivot upwards about the second articulation 11 by means of the operating member 22 until the cutting mechanism 4 extends substantially vertically in the transport position.

As soon as the cutting mechanism 4 is in its transport position, the operator stops operating the operating ram 23 and ceases his action on the cord 48.

It will be noted that during movement into the transport position, the value of the angle α between the second lever 28 and the rod 27 of the operating ram 23 increases further, and this has the effect of automatically making the cam 46 act on the bearing element 47 of the retractable stop 39 so as to make the retractable stop 39 pivot upwards into the retracted position about the ninth articulation 40 so that the front part 42 of the retractable stop 39 can come free of the body 26 of the operating ram 23 and allow the rod 27 to be retracted still further into the body of the operating ram 23.

To move the cutting machine 1 from the transport position into the work position, the operator will carry out the various operations in the opposite order, and this in particular has the effect of reducing the value of the angle α between the second lever 28 and the rod 27 of the operating ram 23 and means that the cam 46 stops acting on the bearing element 47 of the retractable stop 39 allowing the latter to return to its work position under the effect of its own weight and in which position it rests on the rod 27 of the operating ram 23 via the protective member 41.

Finally, various modifications are still possible, especially as regards the construction of the various elements or by substituting technical equivalents, without in any way departing from the field of protection defined by the claims.

Thus it is perfectly possible to envisage a return spring fixed on the one hand to the retractable stop 39 and on the other hand to the rod 27 of the operating ram 23 so as to assist with moving the retractable stop 39 into the windrowing and work position.

It is also perfectly possible to envisage a retractable stop 39 of adjustable length, so that the position of the cutting mechanism 4 in the windrowing position can be varied.

What is claimed as new and desired to be secured by Letters Patent of the United States is:

1. Cutting machine comprising:
   a cutting mechanism extending:
   in a work position, transversely to a direction of travel and at ground level;
   in a windrowing position, transversely to the direction of travel and at a certain distance above the ground; and
   in a transport position, substantially vertically upwards;
   a hitching structure connectable to a hitching device of a motor vehicle;
   a carrying beam connected on the one hand to the hitching structure by a first articulation and on the other hand to the cutting mechanism by a second articulation;
   an operating device acting between the cutting mechanism, the hitching structure and the carrying beam, the operating device allowing the cutting mechanism to be brought into the work, windrowing and transport positions and comprising:
   an operating member comprising a latch for resting on the carrying beam in order to stop upwards pivoting of the cutting mechanism about a longitudinal axis of the second articulation during movement of the cutting mechanism into the windrowing position; and
   an operating ram connected at one end thereof to the operating member by a third articulation and at another end thereof to the hitching structure by a fourth articulation;
   wherein the operating device additionally comprises a retractable stop which limits the upwards pivoting of the carrying beam about a longitudinal axis of the first articulation when the cutting mechanism is extending in the windrowing position and which is retracted to allow the cutting mechanism to be placed in the transport position, the retractable stop being set in place and retracted automatically by a control mechanism when the cutting mechanism is brought from the work position or from the windrowing position into the transport position.

2. Cutting machine according to claim 1, wherein the retractable stop limits the travel of the operating ram when the cutting mechanism is extending in the windrowing position.

3. Cutting machine according to claim 1, wherein the retractable stop is connected to the operating ram by a fifth articulation that is at least substantially parallel to said third and fourth articulations that respectively connect the operating ram to the operating member and to the hitching structure.

4. Cutting machine according to claim 3, wherein the retractable stop is connected to a rod of the operating ram by a fifth articulation.

5. Cutting machine according to claim 1, wherein the retractable stop rests against a body of the operating ram in the windrowing position.

6. Cutting machine according to claim 5, wherein in the windrowing position, when the retractable stop rests against the body of the operating ram, a line of action of the retractable stop is at least substantially coincident with a longitudinal axis of the operating ram.

7. Cutting machine according to claim 1, wherein in the work position and in the windrowing position, the retractable stop rests on a rod of the operating ram via a protective member which protects the rod.

8. Cutting machine according to claim 7, wherein the protective member is made of flexible plastic and is fixed to the retractable stop.

9. Cutting machine according to claim 1, wherein the control mechanism that allows the retractable stop to be set in place and to be retracted comprises a cam which acts on the retractable stop when the cutting mechanism is brought from the work position or from the windrowing position into the transport position.

10. Cutting machine according to claim 9, wherein the retractable stop is connected to the operating ram by a fifth circulation that is at least substantially parallel to said third and fourth articulations that respectively connect the operating ram to the operating member and to the hitching structure, and wherein the cam acts on the retractable stop so as to make it pivot about the fifth articulation that connects the retractable stop to the operating ram.

11. Cutting machine according to claim 9, wherein the cam forms part of a lever belonging to the operating member, the lever being articulated at one end thereof to an end of the operating ram and at another end thereof to one of the carrying beam and the cutting mechanism.

12. Cutting machine according to claim 11, wherein the retractable stop is connected to the operating ram by means of a fifth articulation that is at least substantially parallel to third and fourth articulations that respectively connect the operating ram to the operating member and to the hitching structure, and wherein the cam is fitted to the lever of the operating member in such a way that a certain angular variation between the lever and the operating ram as the cutting mechanism is being placed in the transport position, makes the cam act on the retractable stop in order to pivot the retractable stop about the fifth articulation that connects the retractable stop to the operating ram.

13. Cutting machine according to claim 12, wherein the cam acts on the retractable stop when a value of an angle between the lever and the operating ram increases.

14. Cutting machine according to claim 13, wherein the latch of the operating member can be retracted to allow the cutting mechanism to pivot upwards about the longitudinal axis of the second articulation so as to place it in the transport position, thus making it possible to increase the value of the angle between the lever and the operating ram, so as to retract the retractable stop to bring to an end the phase of placing the cutting mechanism in the transport position.

* * * * *